United States Patent
Coombs

[15] 3,671,710
[45] June 20, 1972

[54] WELDING STUD AND METHOD

[72] Inventor: Ivan G. Coombs, Redondo Beach, Calif.
[73] Assignee: John A. Stephens, Los Angeles, Calif.
[22] Filed: June 17, 1970
[21] Appl. No.: 47,053

[52] U.S. Cl. ............................................................219/99
[51] Int. Cl. ..................................................B23k 9/20
[58] Field of Search .........................219/98, 99, 136, 93

[56] References Cited

UNITED STATES PATENTS

| | | | |
|---|---|---|---|
| 3,363,084 | 1/1968 | Büsing | 219/99 |
| 3,508,028 | 4/1970 | Pease | 219/136 |
| 2,268,416 | 12/1941 | Nelson | 219/99 X |
| 2,788,233 | 4/1957 | Enright | 219/99 X |

*Primary Examiner*—R. F. Staubly
*Attorney*—Nilsson, Robbins, Wills and Berliner

[57] ABSTRACT

A welding stud having a cylindrical welding end with a continuous annular peripheral edge surrounding a centrally axial recess, the weldable end and the metal sheet to which it is to be attached being brought together in a substantially parallel relationship, whereby a ring discharge of the arc is effected along the annular edge.

2 Claims, 2 Drawing Figures

Patented June 20, 1972    3,671,710

INVENTOR.
IVAN G. COOMBS.
BY
Nilsson, Robbins, Wills & Berliner
Attorneys.

3,671,710

WELDING STUD AND METHOD

FIELD OF THE INVENTION

The field of art to which the invention pertains includes the field of flash welding of studs and rod joints.

BACKGROUND AND SUMMARY OF THE INVENTION

In welding studs or other rod-like members to the surface of sheet metal, it is conventional to connect the sheet metal and stud in a series relationship in an electric welding circuit, whereby an electric arc is discharged between the end of the stud and an area of the sheet metal to which the stud is to be attached. The end of the stud and the attachment area of the sheet metal are both brought to proper fusion temperature by means of said arc and then molten portions thereof are brought together so that the stud is bonded to the sheet metal.

In practicing this method, the end of the welding stud is conventionally provided with a central axial projection whereby the arc begins and may be concentrated in a central position. However, it is found that such studs often yield welds which are formed with undesirable peripheral weld characteristics. A deep center melt is formed which can result in the splashing out of considerable metal and in the formation of welds having cold weld characteristics at the peripheral edge of the joint.

The present invention provides a welding stud and method which produces a clean, uniform weld with excellent melt average across the weld junction surfaces. In accordance with this invention, a welding stud is provided having a cylindrical welding end and in which the weld face has a continuous annular peripheral edge surrounding a centrally axial recess. The recess is preferably uniformly concave and extends substantially entirely across the weld face of the stud. Particularly when stud welding with flat sheet metal, the arc plasma produces a ring discharge at the peripheral edge and progressively builds up across the cavity, yielding a uniform melt across the weld junction.

DESCRIPTION OF THE PREFERRED EMBODIMENT

Figure 1:
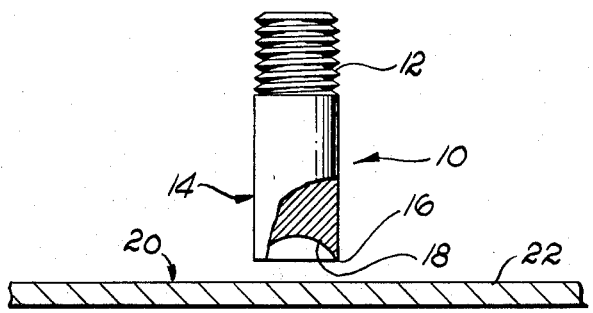
FIG. 1 is a side elevational view of a stud constructed in accordance with the teachings of the present invention, shown positioned adjacent flat sheet metal, a portion of the stud body being shown in cross section to disclose the construction of the weld end.

Referring to the drawing, the numeral 10 identifies a stud 10 embodying the teachings of the present invention which may be threaded at one end, as at 12, or said end may be furnished plain or with a head, as desired. The other end of the stud 10 is designated as the weldable end and is indicated by the reference numeral 14.

The weldable end 14 is preferably of cylindrical shape and the end face thereof is formed to provide a continuous annular peripheral edge 16 surrounding a recess 18, i.e. the edge 16 is free of notches or recesses which would permit molten metal to splash out or heat to escape, as will be described more fully hereinafter. The recess 18 can be conical or arcuate in shape, and is preferably uniformly concave and centered axially of the end face, and, as shown, extends substantially entirely across the end face.

The stud 10 is particularly well adapted to be welded to a sheet metal member 20 having a substantially flat face or surface 22.

In use, the weld stud 10 and the sheet metal member are connected in series in an electric welding circuit, and the weldable end 14 and the surface 22 are moved together with the plane of the peripheral edge 16 substantially parallel with the surface or face 22, as illustrated in FIG. 1.

Figure 2:
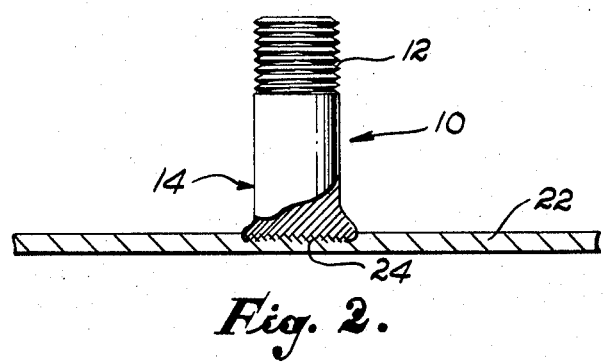
FIG. 2 is a side elevational view of the stud and sheet metal of FIG. 1 after welding thereof and showing a portion of the weld joint in cross section.

As the arc plasma forms, it produces a ring discharge at the peripheral edge 16, and progressively builds up across the recess or cavity 18, thereby producing a uniform melt average across the weld juncture surfaces 24, shown in FIG. 2. The continuous peripheral edge 16 retains the heat and also limits the splashing-out of the molten metal.

As mentioned hereinabove, the conventional weld stud with a central projection at which the arc begins, forms a deep center melt with considerable metal splashed out and with cold weld characteristics at the outer edge. On the other hand, with the present invention, a uniform melt is provided across the entire end surface with a minimum amount of metal splashing so as to provide a cleaner weld.

I claim:

1. A welding stud having a weldable end portion formed with a cylindrical outer surface defining the terminal longitudinal boundary of said stud and with an end face provided with a continuous annular peripheral edge at said boundary surrounding a recess, said recess being uniformly concave and extending substantially across the end face and having the concavity thereof progressively deepening from the peripheral edge toward the center of the recess.

2. The method of arc welding a stud to a member with a substantially flat surface, which includes the steps of:
   providing a stud with a weldable end portion formed with a cylindrical outer surface defining the terminal longitudinal boundary of said stud and with an end face having an annular peripheral edge at said boundary surrounding a recess, said recess being uniformly concave and extending substantially across the end face and having the concavity thereof progressively deepening from the peripheral edge toward the center of the recess;
   connecting the stud and the member in series in an electrical welding circuit;
   moving the stud and the member together into contact with the plane of the annular peripheral edge of the stud substantially parallel with the surface of the member to initiate a ring discharge at the peripheral edge, whereby the arc plasma builds up across the end face.

\* \* \* \* \*